No. 763,248. PATENTED JUNE 21, 1904.
F. M. BISHOP.
INSTRUMENT FOR DETECTING AND CORRECTING DEFECTIVE VISION.
APPLICATION FILED NOV. 13, 1903.
NO MODEL.
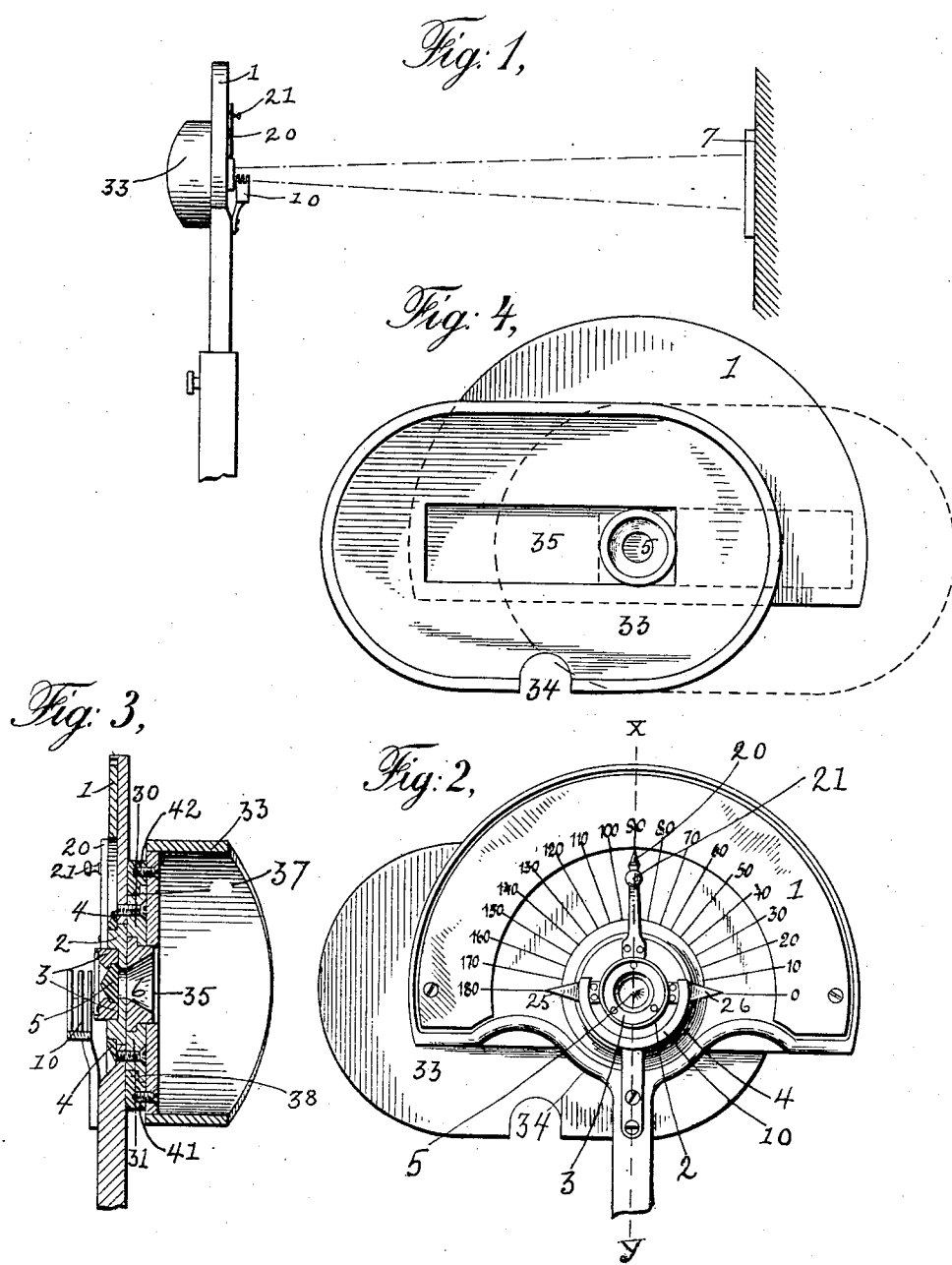

No. 763,248.

Patented June 21, 1904.

UNITED STATES PATENT OFFICE.

FRANCIS M. BISHOP, OF NEWARK VALLEY, NEW YORK.

INSTRUMENT FOR DETECTING AND CORRECTING DEFECTIVE VISION.

SPECIFICATION forming part of Letters Patent No. 763,248, dated June 21, 1904.

Application filed November 13, 1903. Serial No. 180,987. (No model.)

*To all whom it may concern:*

Be it known that I, FRANCIS M. BISHOP, M. D., a citizen of the United States, residing at Newark Valley, in the county of Tioga and State of New York, have invented certain new and useful Improvements in Instruments for Detecting and Correcting Defective Vision, of which the following specification is a full, clear, and exact description, reference being had to the accompanying drawings, in which—

Figure 1 is a side view of an eye-testing instrument and test-chart. Fig. 2 is a front view showing the dial-face, indicators, lens-holders, &c. Fig. 3 is a cross-section on the line $x\ y$ in Fig. 2, and Fig. 4 is a back view showing the light-excluding hood and head-rest.

The invention relates primarily to instruments for detecting and measuring certain defects of the eye—notably myopia, hypermetropia, and astigmatism—by means of a test-lens and for correcting the same by means of trial-lenses. In general such instruments consist of a suitably-mounted dial-plate, the face of which is graduated into the degrees of a circle, and a rotatable prismatic test-lens and mounting, provided with means to determine the quadrant-line of the test-lens and the location of the meridian or defective axis of the abnormal eye.

In the dial-plate 1, having its face graduated into the degrees of the circle, is a circular rotating lens-holder 2, carrying the test-lens 5 and working in the circular stepped depression in the dial-plate. The lens 5 is held in place by the mounting-ring 3, and the entire lens and mount is held in the stepped depression by the spring clamping-ring 4, which permits the mount carrying the lens to rotate within the depression, but which creates sufficient friction to retain it in any set position. An opening 6 in the dial-plate allows the lens to be looked through from the back. A holder 10 is secured in front of the test-lens to receive the trial-lenses used in correcting the defective vision. The mounting 2 of the test-lens 5 is provided with a pointer 20 to indicate the particular meridian under examination in the eye of the patient, and on the pointer is a knob 21, by means of which the lens and holder may be rotated to any desired degree. The pointers 25 and 26 indicate the quadrant-line or axis of the test-lens 5. By reason of the length of these pointers they bridge the ungraduated gap on the lens-mounting 2 and the clamp-ring 4, thus enabling a degree-reading of the quadrant-line to be quickly, easily, and correctly obtained. In the instruments heretofore made a fine line has been engraved on the lens-mount 2 to represent the quadrant-line. This has been troublesome in use on account of its fineness and the difficulty of discovering it in any but the strongest light. The lack of continuity caused by the clamping-ring 4 forced the oculist to estimate the continuation of the line, which was not always done correctly. The use of these pointers gives at once an absolute reading.

To the back of the dial-plate are secured guides 30 31, the stepped edges of which form, in conjunction with the back of the plate 1, a pair of grooves 37 and 38. A hood 33, similar to that used in a stereoscope, is provided with tongue-strips 41 42, which engage the grooves 37 38, thus permitting a lateral sliding movement of the hood. An oblong opening 35 in the back of the hood affords an unobstructed view through the test-lens 5. As the head of the patient is moved from side to side the hood moves with it, enabling first one eye and then the other to be tested. The use of this hood screens from the eye practically all light except that coming through the lens 5. Previous to my application of a hood to these instruments one eye has been placed to the back of the lens to view the test-chart 7, whereupon the proper readings and corrections have been made, and after this eye was tested the other eye was placed to the lens and tested. In shifting from one eye to the other the distance between eye and lens was not always maintained, so that the relative readings for each eye were affected. The hood prevents any movement of the head when once the correct position is found and maintains the head in that position until the test is completed. Where no hood was used, the extraneous light rendered the image more or less indistinct. By the use of the hood one eye is first tested with the hood moved to one side, as shown in full lines in Fig. 4, (in position for the right eye.) After the tests of this eye are completed the head is moved, carrying the hood to the other side, as indicated in dotted lines, (position for left eye,) and the other eye tested. The face of the patient engages the edges of the hood in both positions, the nose entering the recess 34, and consequently both eyes are kept at the same distance from the test-lens 5, and all readings are therefore relatively correct.

In use the pointer 20 is turned until the greatest distortion of the test-chart 7 is apparent. Having thus determined the most defective meridian of the eye, the lens 5 is revolved until the quadrant-line (indicated by the pointers 25 26) coincides with the previously-determined meridian. The proper trial-glasses are then placed in the holder 10 until the aberration is corrected.

Having thus described my invention, what I claim as new, and desire to secure by Letters Patent, is—

1. In an eye-testing instrument the combination of a test-lens in a suitable mounting, and a laterally-movable head-rest secured at the back of said lens-mounting, said head-rest being made to fit against and extend across the forehead and to afford a firm bearing for the head while the eyes are being tested.

2. In an eye-testing instrument the combination of a test-lens in a suitable mounting and a laterally-movable light-excluding hood secured at the back of said lens-mounting said hood being made to fit against and extend across the forehead and to afford a firm bearing for the head while the eyes are being tested.

3. In an eye-testing instrument comprising a dial-plate, the combination of a test-lens mounted in the dial-plate and a light-excluding hood laterally movable on the back of the dial-plate, said hood being made to fit against and extend across the forehead and to afford a firm bearing for the head while the eyes are being tested.

4. In an eye-testing instrument the combination of a test-lens in a suitable mounting and a laterally-movable light-excluding hood secured at the back of said lens-mounting said hood being made to fit against the forehead and against the face under the eyes and to extend around the eyes and across the nose.

5. In an eye-testing instrument, the combination of a graduated dial-plate carrying a rotatable test-lens and mounting, said mounting being provided with a pair of pointers indicating the quadrant-line of the test-lens and bridging the ungraduated gap between the test-lens and the scale on the face of the dial-plate.

6. In an eye-testing instrument the combination of a graduated dial-plate having a lens rotatably mounted thereon and provided with quadrant-indicators which coöperate with the graduations on the dial-plate, and a laterally-movable head-rest secured to the back of said plate.

In testimony whereof I have signed my name to this specification in the presence of two subscribing witnesses.

FRANCIS M. BISHOP.

Witnesses:
H. B. CHAMBERLAIN,
GEO. S. CHAMBERLAIN.